A. BURDICK.
Sausage Meat Mincer.
No. 6,652.
Patented Aug. 21, 1849
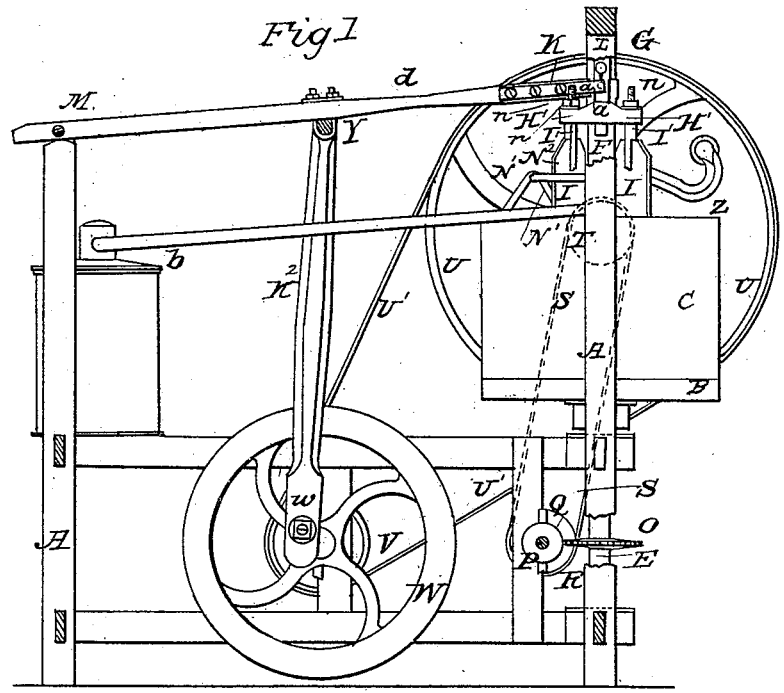
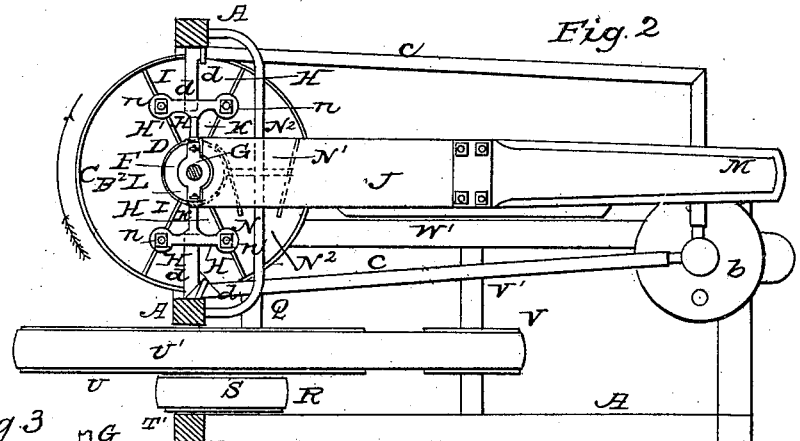
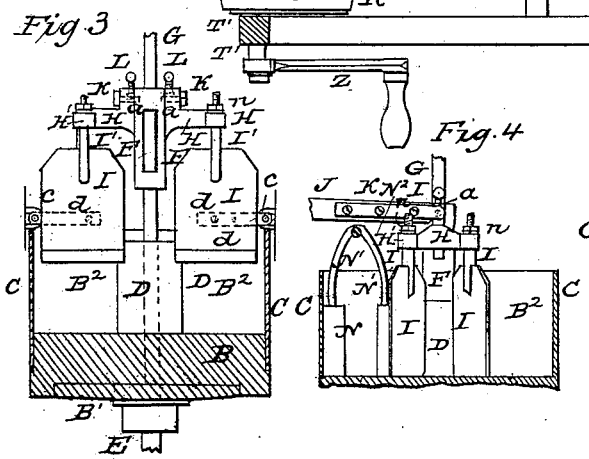
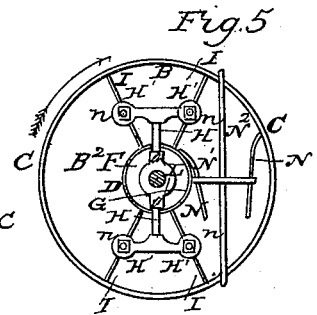

UNITED STATES PATENT OFFICE.

ALLEN BURDICK, OF GLENNS FALLS, NEW YORK.

MEAT-CUTTER.

Specification of Letters Patent No. 6,652, dated August 21, 1849.

*To all whom it may concern:*

Be it known that I, ALLEN BURDICK, of near Glenns Falls, in the county of Saratoga and State of New York, have invented a new and useful Improvement in the machine for Mincing Sausage-Meat, called "Burdick's Improved Sausage-Machine," which is described as follows, reference being had to the annexed drawings of the same, making part of this specification.

My invention consists in the combination and arrangement of the vibrating spring beam J with its knife stock F and knives I; the latter made to rise and fall vertically and a rotating block on which the meat is minced; and also combining with these a boiler *b* in which steam is generated, and made to escape and come in contact with the knives for giving them a proper temperature to prevent the meat adhering thereto, and imparting to the meat a quality which greatly facilitates the process of seasoning.

The cylinder or block revolves as indicated by the arrow, the operator, standing in front with his right hand upon the handle.

Similar letters in the several figures refer to similar parts.

Figure 1, is an elevation of the left side of the machine. The vibrating spring beam being represented as elevated. Fig. 2, is a plan or top view of ditto, the top cross rail of the frame being removed. Fig. 3, is a front elevation of the knives and stock raised, and sectional view of the cylinder or rotating block. Fig. 4, is an end view of the knives, knife stock, &c., as depressed, and section of the rotating block. Fig. 5 is a plan or top view of the knives, stock, and rotating block.

A is the frame of suitable dimensions, and form to contain the several parts, and support the bearings of the shafts hereafter to be described.

B is the rotary cutter block on which the meat is cut and over which the knives rise and fall. On this block are arranged two concentric curbs C, D, forming an annular space B² between them, in which the meat is minced; said block being placed upon and secured to a circular plate or disk B', let into a cavity in the underside thereof.

E is a vertical propelling shaft turning in boxes in the frame, and supporting the said circular plate or disk and rotating block or cylinder.

F is the knife stock, the core of which is made cylindrical and hollow and rises and falls over a stationary central guide spindle G, whose upper end is secured in the top rail, and the lower end resting in a cavity, in the circular plate B', of the rotating block in the space of the central concentric curbs.

H, H, are two radial arms of the knife stock, on the ends of which are four other branch arms H', at right angles thereto, through the ends of which the shanks I'' of the knives are passed and secured by screws.

I, I, I, I, and 4 knives made of cast steel, and properly dressed with cutting edges, secured diagonally or in the form of an X in the annular space of the concentric curbs, to the branch arms H', on the upper end of whose shanks I', are formed screws to receive nuts which screw upon the arms H', and by which the knives are properly adjusted in relation to the rotating block.

J is a vibrating spring beam, having two perforated plates K screwed to the sides of its front end, from which project stout pins *a*, *a*, which enter corresponding holes in the upper end of the knife stock, and by which it is connected to the knife stock.

L, L, are two set screws in the top of the knife stock, which screw upon boxes placed upon the ends of the pins *a*, *a*, to tighten them as they become loose.

M is the fulcrum of the vibrating spring beam attached to one of the corner posts of the frame. This beam is reduced in thickness near its front end, in order to give it elasticity so as to bend or yield with the blow of the knives upon the top of the rotating block, and at the same time to effect a quick reacting movement of the knives and shield the rotating block from that unyielding and jarring effect which it would receive were the vibrating beam rigid.

N N are two plates, which serve to direct or gather the meat as it is advanced into the center of the annular space while the cylinder is rotating. These plates are suspended by branch arms N', to a bar N², fastened to the frame.

O is a cog wheel on the vertical shaft of the rotating block, into which works a worm P on the inner end of a horizontal shaft Q turning in boxes in the frame, and having on its opposite end a pulley R around which a band S is passed leading to a pulley T on the crank axle T', on which also is the main driving band wheel U around which a band U', is passed leading to a pulley V on a horizontal shaft V', turning in bearings near the center of the frame, and on whose opposite end there is a balance or fly wheel W to which a pitman or connecting rod $K^2$ is attached by a stud or pin $w$ on one of its arms, and by which the spring beam is vibrated, its upper end being connected therewith by staples Y in which it turns.

Z is a crank handle on the axle T', of the driving band wheel, by which the machinery is operated when manual power is employed.

When it is desired to increase or diminish the vertical movement of the spring beam, and knives the connection of the connecting rod therewith must be moved toward or farther from the knife stock.

$b$ is a boiler of any suitable size and form and may be placed in any convenient part of the frame, for generating steam, by placing it on or over a portable heater or furnace.

$c\ c$ are pipes connecting with the generator and extending to the knives and turned at right angles between the knives, having their ends closed and provided with openings $d, d$, in their peripheries through which the steam issues in contact with the knives, the effect of which will be to partially heat, and cause them to retain the proper temperature and moisture to prevent the meat from adhering thereto, and by which the knives are always kept clean and free from clogging. This process of steaming the knives and meat as the same is minced, is found to impart a peculiar quality to the meat, by which the process of seasoning it for market is greatly facilitated and its flavor also improved.

I do not claim to be the original inventor of a machine for mincing meat on a horizontal rotating block by means of oblique knives having a vertical ascending and descending movement, as this is not new; but—

What I do claim as my invention, and desire to secure by Letters Patent, is—

1. The use of the vibrating spring lever J, for the purpose and in the manner described and represented.

2. I claim the use of steam for heating and moistening the cutters, as described.

In testimony whereof I have hereunto signed my name before two subscribing witnesses.

ALLEN BURDICK.

Witnesses:
 LUND WASHINGTON, Sr.,
 WM. P. ELLIOT.